(12) United States Patent
Sawhney et al.

(10) Patent No.: US 10,592,676 B2
(45) Date of Patent: Mar. 17, 2020

(54) APPLICATION SECURITY SERVICE

(71) Applicant: Tala Security, Inc., Fremont, CA (US)

(72) Inventors: Sanjay Sawhney, Cupertino, CA (US); Aanand Mahadevan Krishnan, Fremont, CA (US); Somesh Jha, Madison, WI (US); Andrew Joseph Davidson, Dallas, TX (US); Swapnil Bhalode, San Jose, CA (US)

(73) Assignee: Tala Security, Inc., Fremont, CA (US)

( * ) Notice: Subject to any disclaimer, the term of this patent is extended or adjusted under 35 U.S.C. 154(b) by 138 days.

(21) Appl. No.: 15/796,525

(22) Filed: Oct. 27, 2017

(65) Prior Publication Data
US 2018/0121659 A1 May 3, 2018

Related U.S. Application Data

(60) Provisional application No. 62/414,180, filed on Oct. 28, 2016.

(51) Int. Cl.
*H04L 29/06* (2006.01)
*G06F 21/57* (2013.01)
(Continued)

(52) U.S. Cl.
CPC .......... *G06F 21/577* (2013.01); *G06F 21/562* (2013.01); *G06F 21/566* (2013.01); *G06F 21/53* (2013.01); *G06F 2221/033* (2013.01)

(58) Field of Classification Search
CPC ........... H04L 63/0227; H04L 29/06986; G06F 21/562; G06F 21/563; G06F 21/566; G06F 2221/033; G06F 2201/865
(Continued)

(56) References Cited

U.S. PATENT DOCUMENTS

| 2001/0037399 | A1* | 11/2001 | Eylon | ............... H04L 29/06027 |
| | | | | 709/231 |
| 2002/0087949 | A1* | 7/2002 | Golender | ................ G06F 9/547 |
| | | | | 717/124 |

(Continued)

FOREIGN PATENT DOCUMENTS

WO 20140063124 A1 4/2014

OTHER PUBLICATIONS

Wasserman et al, Sound and Precise Analysis of Web Applications for Injection Vulnerabilities, ACM, Jun. 13, 2007, pp. 32-41. (Year: 2007).*

(Continued)

*Primary Examiner* — Alexander Lagor
*Assistant Examiner* — Jenise E Jackson
(74) *Attorney, Agent, or Firm* — Setter Roche LLP; Eric Collins

(57) ABSTRACT

Techniques to facilitate security for a software application are disclosed herein. In at least one implementation, static analysis is performed on code resources associated with the software application to generate static analysis results. Dynamic analysis is performed on a running instance of the software application to generate dynamic analysis results. An application information model of the software application is generated based on the static analysis results and the dynamic analysis results. Security policies for the software application are determined based on the application information model.

20 Claims, 5 Drawing Sheets

(51) Int. Cl.
*G06F 21/56* (2013.01)
*G06F 21/53* (2013.01)

(58) Field of Classification Search
USPC .............................................................. 726/1
See application file for complete search history.

(56) References Cited

U.S. PATENT DOCUMENTS

| | | | |
|---|---|---|---|
| 2005/0108562 A1* | 5/2005 | Khazan | G06F 11/3604 726/23 |
| 2008/0168460 A1* | 7/2008 | Lee | G06F 9/5016 718/104 |
| 2011/0173693 A1 | 7/2011 | Wysopal et al. | |
| 2011/0321001 A1* | 12/2011 | Dutta | G06F 8/75 717/105 |
| 2015/0199515 A1 | 7/2015 | Qureshi | |
| 2017/0308701 A1* | 10/2017 | Nandha Premnath | G06F 21/53 |
| 2017/0346843 A1* | 11/2017 | Zhang | G06F 21/52 |
| 2018/0039779 A1* | 2/2018 | Li | G06F 21/56 |
| 2018/0089431 A1* | 3/2018 | Nalluri | G06F 21/51 |
| 2018/0247045 A1* | 8/2018 | David | G06F 21/44 |
| 2018/0316699 A1* | 11/2018 | David | H04W 4/40 |

OTHER PUBLICATIONS

Rabek et al, Detection of Injected, Dynamically Generated, and Obfuscated Malicious Code, ACM, Oct. 27, 2003, pp. 76-82. (Year: 2003).*

Silva et al, Combining Static and Dynamic Analysis for the Reverse Engineering of Web Applications, ACM, Jun. 27, 2013, pp. 107-112. (Year: 2013).*

Notification of Transmittal of the International Search Report and the Written Opinion of the International Searching Authority, or the Declaration of PCT/US2017/058860, dated Feb. 5, 2018, 11 pages.

* cited by examiner

APPLICATION SECURITY SERVICE

RELATED APPLICATIONS

This application claims the benefit of, and priority to, U.S. Provisional Patent Application No. 62/414,180, entitled "Method for Building a fine grained Application Behavior Whitelist", filed on Oct. 28, 2016, which is hereby incorporated by reference in its entirety for all purposes.

TECHNICAL BACKGROUND

Software application architectures have undergone a fundamental shift towards client-heavy processing. As software applications have become more client-heavy, the threat landscape has also shifted towards client-side attacks, such as cross-site scripting (XSS), cross-site request forgery (CSRF), web injection attacks, document object model (DOM) based attacks, and others. Such attacks could lead to credential theft, fraud, advertisement injection, malware advertisements, traffic redirection, or large-scale data loss, all of which can result in lost revenue and lower return on investment on advertising and traffic acquisition.

Application-layer attacks are a major vulnerability of the security industry and are one of the largest sources of data breaches. Application-layer attacks exploit vulnerabilities within an application as well as insecure components and insecure coding practices used in building the application. Existing methodologies to protect an application rely on analysis techniques to identify already-published or known bugs and vulnerabilities, and then either requiring the application software developers to fix those bugs and remove the vulnerabilities in the application code, or generating virtual patches that can be configured on network firewalls and intrusion prevention systems to prevent the exploitation of those vulnerabilities. However, this blacklist approach, which attempts to prevent known malicious users, code, or inputs from reaching the application, offers inadequate protection because it only protects against attack vectors and vulnerabilities that have been previously discovered.

Overview

Techniques to facilitate security for a software application are disclosed herein. In at least one implementation, static analysis is performed on code resources associated with the software application to generate static analysis results. Dynamic analysis is performed on a running instance of the software application to generate dynamic analysis results. An application information model of the software application is generated based on the static analysis results and the dynamic analysis results. Security policies for the software application are determined based on the application information model.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

Figure 1:
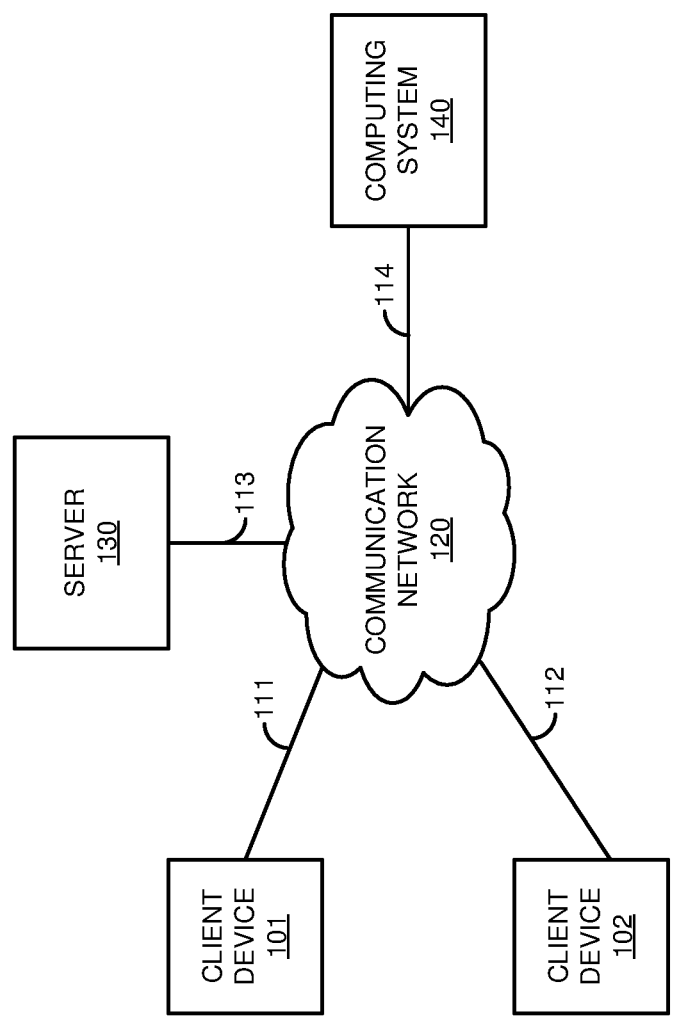
FIG. 1 is a block diagram that illustrates a communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The techniques disclosed herein provide a security solution to application-layer attacks that protects all end user client devices running a software application, without the use of an agent of any other changes to the application. The system leverages browser security standards such as content security policy (CSP) and is easily deployed as simple configuration changes on the web server or injected through third-party application delivery controllers or content delivery networks (CDNs). CSP provides client-side security for applications which can help detect and protect against client-side attacks such as XSS, clickjacking, packet sniffing, and others. CSP is supported by most modern web browsers, including mobile browsers. Client-side attacks primarily exploit a browser's inability to distinguish between a legitimate script that is part of the software application and a malicious script that has been injected by an attacker. CSP relies on a whitelist of behaviors that allow the browser to identify legitimate and malicious code, thereby detecting and blocking a wide range of client-side attacks. CSP policy directives can limit which origins a client can connect to, valid endpoints for users to submit data, and sources of images, fonts, and scripts. CSP also has a report-uri directive that allows for client devices to send violation reports to a specified uniform resource identifier (URI).

As CSP relies on a whitelist approach, it has the ability to potentially prevent exploitation of even zero-day vulnerabilities that have not been seen before. However, although CSP is a powerful security mechanism, it is complex and difficult to implement for application owners. The security solutions disclosed herein can effectively leverage CSP by combining multiple analysis techniques to create a sophisticated and comprehensive whitelist for a software application. By utilizing a set of cloud-based services that provide advanced application analysis and threat analytics, the system can thoroughly analyze an enterprise software application and generate a fine-grained, client-side security model, called the application information model. A policy generation engine then coverts the application information model into a virtual, policy-based sandbox. Standard security features available in modern PC and mobile browsers such as CSP may then be used to enforce the sandbox. In addition, the system provides outstanding visibility into the client attack surface, since when a violation is detected by a client browser, the cloud analytics services gets an alert from the browser.

Figure 2:
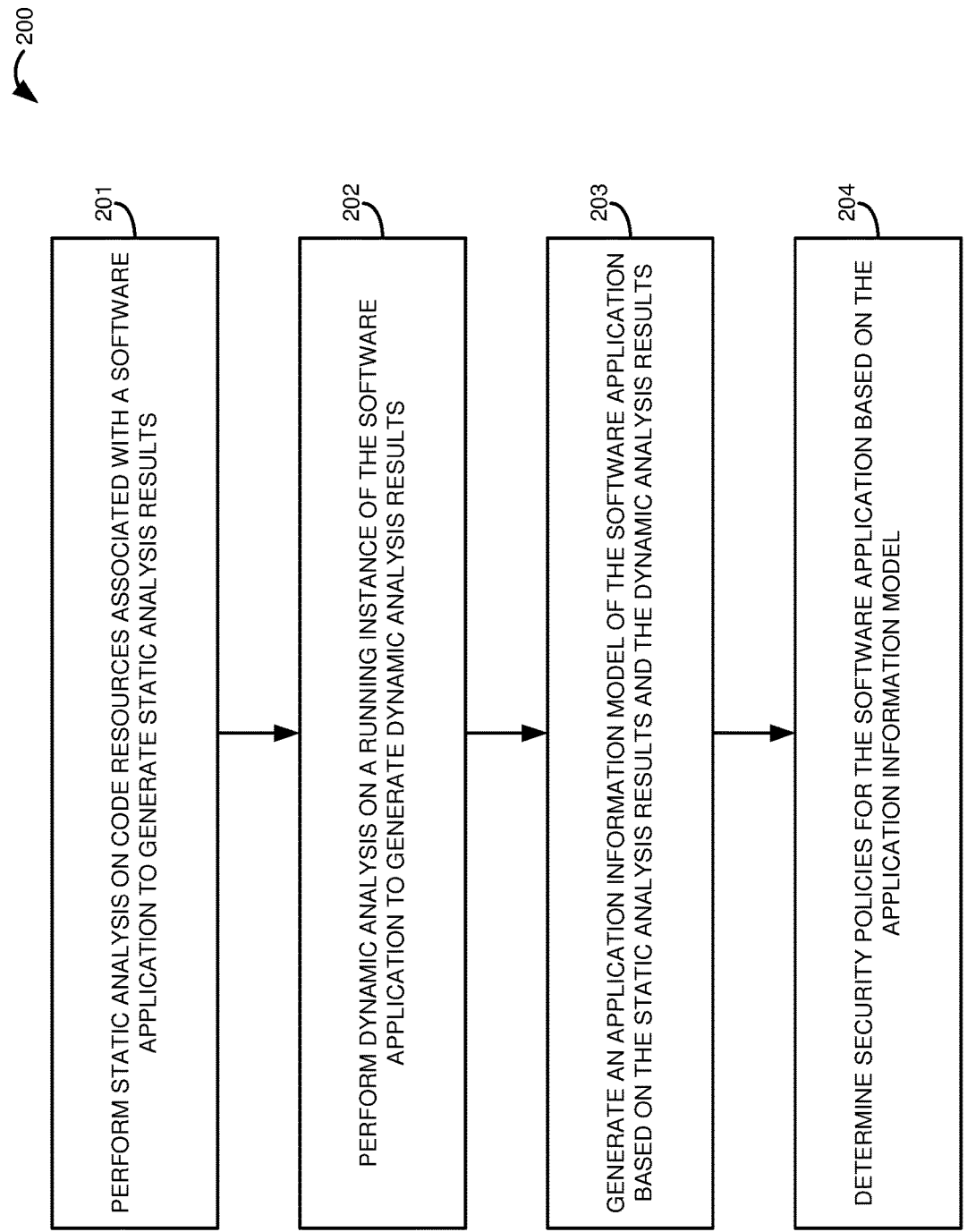
FIG. 2 is a flow diagram that illustrates an operation of the communication system.
Figure 3:
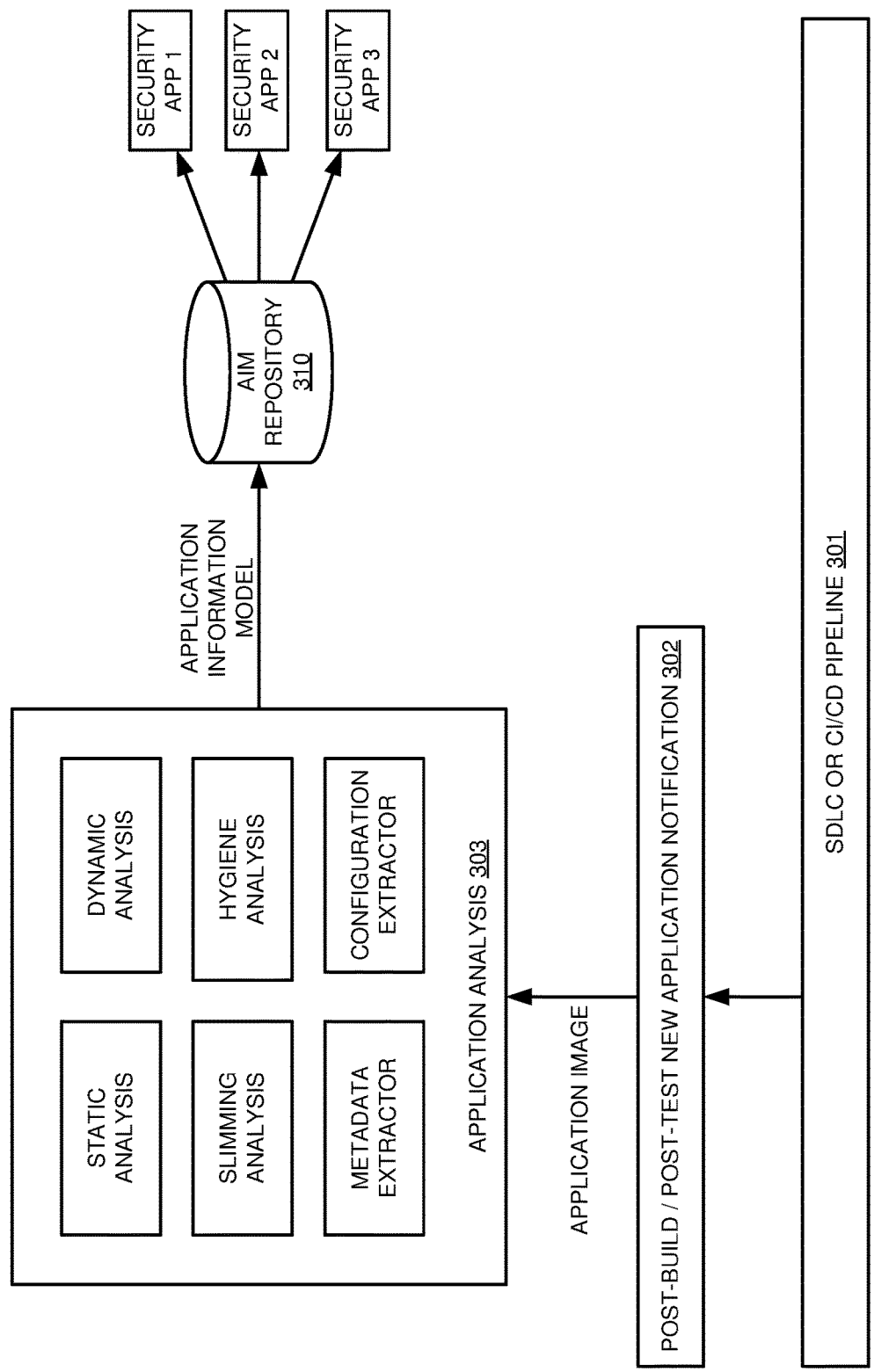
FIG. 3 is a flow diagram that illustrates an operation of a communication system in an exemplary embodiment.
Figure 4:
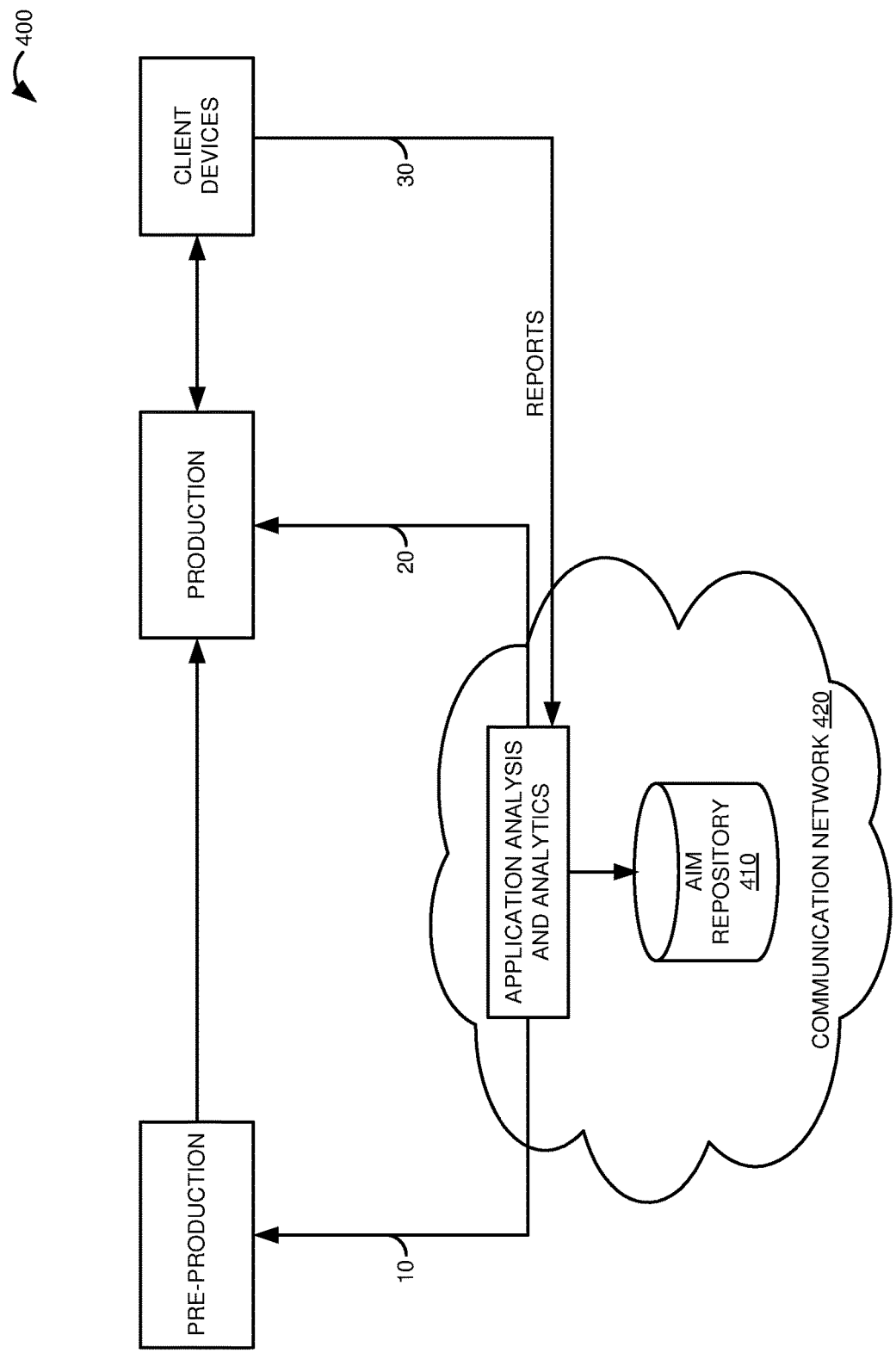
FIG. 4 is a flow diagram that illustrates an operation of a communication system in an exemplary embodiment.
Figure 5:
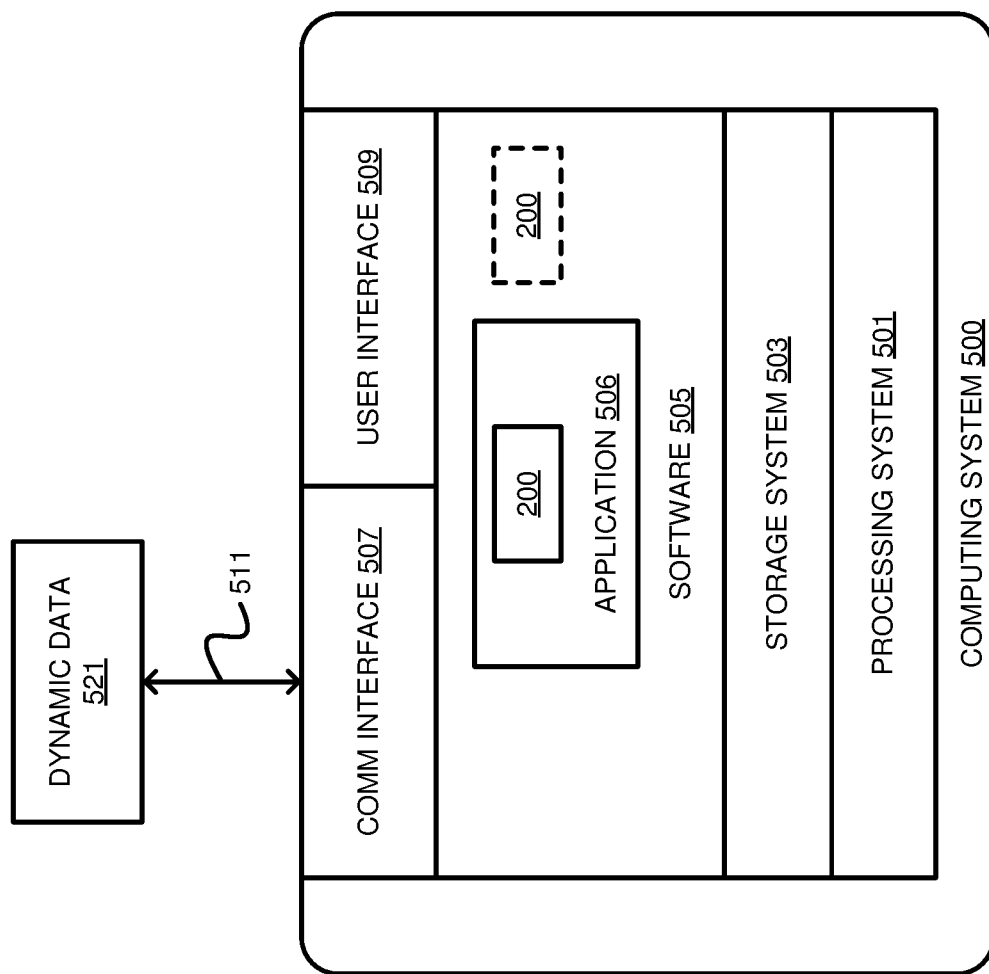
FIG. 5 is a block diagram that illustrates a computing system.

Referring now to the drawings, FIG. 1 illustrates a communication system that may be used to analyze and secure a software application. FIG. 2 is a flow diagram that illustrates a software application security process that may be performed by the communication system. FIGS. 3 and 4 describe two scenarios when an application information model extraction module can be deployed. In FIG. 3, the application information model extraction module is inserted into a software development life cycle (SDLC) or continuous integration/continuous delivery (CI/CD) pipeline using webhooks, and every time a new or updated application is built, its image is automatically analyzed to derive its application information model before the application is deployed in a production setting. In FIG. 4, application information model extraction process follows a phase of remotely gathering information about an application, such as by crawling a website, in a pre-production and/or production environment. Finally, FIG. 5 illustrates an exemplary computing system that may be used to perform any of the software application security processes and operational scenarios described herein.

Turning now to FIG. 1, a block diagram of communication system 100 is illustrated. Communication system 100 includes client devices 101 and 102, communication network 120, server 130, and computing system 140. Client device 101 and communication network 120 communicate over communication link 111, while client device 102 and communication network 120 communicate over communication link 112. Communication network 120 and server 130 are in communication over communication link 113. Computing system 140 and communication network 120 communicate over communication link 114. In at least one implementation, computing system 140 could comprise a system that provides a cloud-based web service.

In operation, computing system 140 executes an advanced application analysis and threat analytics service to analyze a software application and generate an application information model. This model defines a set of security-relevant behaviors and attributes of the application that describe the application's interaction with the surrounding infrastructure, such as hardware, operating system, network, file system, libraries, frameworks, and public, private, or hybrid cloud. The application information model also describes the application's interaction with other application-level entities, such as clients, servers, and remote peers, and further describes dependencies on resource providers, such as memory, external code or scripts, uniform resource locators (URLs), data, and the like. All behaviors in this set are legitimate when the application is running in an uncompromised state, meaning the application's execution code has not been altered with malicious code or data injection. These security-relevant behaviors may be grouped under different classes such as system calls, messaging, software and/or hardware interrupts, storage, file system, and/or network interactions, client requests and responses, remote procedure calls, and others. To build an exhaustive application information model, several application analysis techniques are combined, such as static analysis of source code and/or a binary image of the application, dynamic analysis of a running application in an instrumented environment, dynamic analysis by remotely exercising the application, metadata analysis, dependency analysis between components, libraries, frameworks, runtime parameters, and service discovery, among other analysis techniques. The combination of analysis techniques may be used to calculate a confidence level about the accuracy and completeness on a per-attribute or per-attribute class basis. Once generated, the application information model can then be used to generate security policies for a software application which may be downloaded by server 130 along with an enforcement module that can be embedded within the server 130. Every browser of each client device 101 and 102 that access the software application provided by server 130 will get infused with these security policies. Accordingly, no agent needs to be installed at the end points or server 130 to enforce these security policies, and any violations to the whitelist policies will be sent by the client browsers to a report uniform resource identifier (URI) of the cloud-based analytics service. An exemplary implementation for analyzing a software application and generating an application information model will now be discussed with respect to FIG. 2.

FIG. 2 is a flow diagram that illustrates an operation 200 of communication system 100. The operation 200 shown in FIG. 2 may also be referred to as software application security process 200 herein. The steps of the operation are indicated below parenthetically. The following discussion of operation 200 will proceed with reference to computing system 140 and server 130 of FIG. 1 in order to illustrate its operations, but note that the details provided in FIG. 1 are merely exemplary and not intended to limit the scope of process 200 to the specific implementation shown in FIG. 1.

Operation 200 may be employed by computing system 140 to facilitate security for a software application. As shown in the operational flow of FIG. 2, computing system 140 performs static analysis on code resources associated with the software application to generate static analysis results (201). In some examples, the software application could comprise any application that interacts with server 130, whether through a web browser or a stand-alone application, such as a mobile application. The software application could be distributed across multiple components, such as partially executing on a server or backend system and partially executing on a client or frontend system. For example, the software application could comprise a stand-alone, self-contained application or a multi-component application running in a distributed systems setting in a public, private, or hybrid cloud on a physical or virtual machine. In some implementations, the software application could not include an interface, such as a library or component having no user interface or web interface.

The code resources associated with the software application could comprise any source code of the application such as JavaScript® or any other code or scripts. The code resources could further comprise a binary image. The binary image form could be wrapped in any packing format, such as zip, tar, self-archiving, Docker® image file, and others, either as a stand-alone entity that is ready to run and execute, or as a helper library or component that is invoked by a stand-alone, ready-to-run executable. The static analysis is performed on the code resources of the software application to get a more complete view of the operations that may be performed by the application. In some examples, performing the static analysis on the code resources associated with the software application comprises analyzing a binary image of the software application. For example, to perform the static analysis, computing system 140 could unpack a binary image format or Java® byte code, and can then use techniques like data flow analysis to determine the various code parts that are present in the application.

However, while static analysis can provide a good understanding of what behavior to expect from the binary code of the application, it can still miss some functionality that may occur at runtime, such as runtime dependencies of the software application. For example, the application may take some information from configuration files or other libraries that are used during runtime, and this behavior would not necessarily be captured by static analysis of the application code. In addition, even with knowledge of the configuration files or framework libraries that are used by the application during runtime, it may not be possible to statically analyze certain libraries and other resources because they operate as a black box. However, the static analysis may be performed on any readable code resources associated with the software application to generate the static analysis results, such as source code, binary images, scripts, libraries, configuration files, metadata, or any other resources. For example, metadata might describe dependencies in the application image file, such as the application relying on certain libraries, and this information could be included in the static analysis results. In at least one implementation, static analysis is used to analyze scripts and their structure, and abstract syntax trees are built to break the scripts down to abstractions, and the scripts can then be mapped down to a fewer number of abstractions. Other attributes could be included as components in the static analysis results, such as a command line argument used to launch an application. Any other static analysis that may be performed on any code resources associated with the software application may be included in the static analysis results and is within the scope of this disclosure.

Computing system 140 performs dynamic analysis on a running instance of the software application to generate dynamic analysis results (202). By performing dynamic analysis on the software application during execution, a more complete understanding of the behavior of the application can be achieved. For example, the dynamic analysis can include driving an application with exhaustive inputs in an attempt to exercise all of the code of the application, and observing the outputs and other resulting behavior of the application. The dynamic analysis may be performed on a running application in an instrumented environment, such as a staging area, and may be performed at either a pre-production and/or a post-production stage of the application. In some examples, performing the dynamic analysis on the running instance of the software application could comprise remotely exercising functionality of the software application. For example, when accessing a software application with a browser, computing system 140 could drive the application through the browser to exercise the code of the application and programmatically infer all of the behavior of the application, and crawl the various web pages to perform runtime analysis as the pages are driven through the browser to observe what is loaded and how the software application operates. While performing the dynamic runtime analysis, any scripts and other resources that are accessed by the software application could be stored by computing system 140, which could then be subjected to the static analysis described above, as well as executed to exercise the scripts while performing the dynamic analysis. Some examples of the behavior that may be gleaned from exercising the software application at runtime during the dynamic analysis include what resources the software application accesses, what libraries the application is dependent on, how many inline scripts and event handlers does the application have and where are they loaded from, what content delivery networks (CDNs) are involved, what plug-ins does it load, such as Flash® or a portable document format (PDF) viewer, and any other functionality that may be observed from running the application. Any other behavior of the software application that may be observed at runtime while performing the dynamic analysis may be included in the dynamic analysis results and is within the scope of this disclosure.

Computing system 140 generates an application information model of the software application based on the static analysis results and the dynamic analysis results (203). The application information model provides a unified, comprehensive view of the software application, based at least on merging the static analysis results and the dynamic analysis results, that fully describes the resources, file system calls, drivers, network calls, and other behavior and operations that may be performed by the application. For example, the application information model captures a comprehensive set of security-relevant behaviors or attributes of a software application that describe the application's interaction with a client device 101 and/or 102, server 130, and third-party content and code repositories, such as advertising networks, CDNs, and the like. The representation of the application information model should capture whether or not a behavior is present, and additional qualifiers such as conditions and inputs that trigger that behavior. Ideally, the representation of the application information model should be abstracted or normalized across all operating systems, languages, frameworks, and likely users of the model, such as CSP and other security enforcement engines that can be configured to protect the application by leveraging the information provided in the model. In some implementations, the application information model could be expressed in JavaScript® object notation (JSON), a collection of scripts written in an expressive scripting language, human-readable text files, a collection of finite state machines represented as transitions in a table, or any other formats, including combinations thereof.

In some examples, the application information model may describe security-relevant behavior of the software application, which could include any legitimate interactions by the application with the infrastructure or other application-level entities. For example, the application information model may define a set of security-relevant behavior and attributes of the application that describe the application's interaction with the surrounding infrastructure, such as hardware, operating system, network, file system, libraries, frameworks, and public, private, or hybrid cloud. The security-relevant behaviors that may be derived from the static and dynamic analysis results and included in the application information model could also describe the application's interaction with other application-level entities, such as clients, servers, and remote peers, and may further describe dependencies on resource providers, such as memory, external code or scripts, URLs, data, and other resources. The external interactions performed by the application may be assessed for input, output, side effects, data flow, code dependencies, triggers, events, callbacks, and other complex relationships between one or more of these interactions, which may be expressed as state machines. Some examples of external interaction points of a software application include operating system (OS)-level application programming interfaces (APIs), library calls, inter-process communications (IPCs), network calls, common application-level protocol requests and responses, such as hypertext transfer protocol (HTTP), representational state transfer (REST), messaging, remote procedure calls (RPCs), and the like, and interactions with hardware, such as hardware security module (HSM), trusted platform module (TPM), software guard extensions (SGX), and others. Further, these security-relevant behaviors can be grouped under different classes, such as system calls, messaging, software and/or hardware interrupts, storage, file system, and/or network interactions, client requests and responses, remote procedure calls, and others classifications.

In some examples, computing system 140 could compute confidence levels for comprehensiveness of the static analysis results and the dynamic analysis results. These confidence levels could further be broken down into the classes of security-relevant behaviors described above. For example, confidence levels for the comprehensiveness of each category of attributes may be computed, either partially or completely for each component or subsystem of the application. The combination of analysis techniques that are used to generate the application information model may thus provide confidence levels about the accuracy and completeness on a per-attribute or pre-attribute class basis.

Computing system 140 determines security policies for the software application based on the application information model (204). In at least one implementation, the security policies are derived from the application information model and expressed in a format that may be parsed by server 130 and/or a browser executing on client devices 101 and 102. For example, computing system 140 could determine the security policies for the software application based on the application information model by generating a whitelist for the software application that indicates approved behavior of the software application. All behaviors in this set are legitimate when the application is running in an uncompromised state, meaning the application's execution code has not been altered with malicious code or data injection. Any behavior outside of this set indicates that the application has been compromised. Computing system 140 could then transfer the security policies for delivery to server 130 associated with the software application, where server 130 deploys the security policies to client devices 101 and 102 running the software application. By leveraging standards such as CSP, the security policies tell the browser on client devices 101 and 102 what constitutes normal, legitimate software application behavior. For example, in at least one implementation, the security policies may be transmitted to client device 101 and 102 over normal HTTP traffic via security headers. When the browser executing on client device 101 and 102 observes any behavior of the software application that deviates from the whitelist of behaviors identified in the security policies, an incident alert is generated and information may be sent directly to a cloud analytics service via a report URI. These reports enable the analytics service to extract fine-grained, browser-level attack telemetry from every client device 101 and 102 that accesses the software application, without deploying any agents. The analytics cloud service can apply advanced analytics, machine learning, and heuristics on the telemetry received from client devices 101 and 102, combined with threat intelligence, the application information model, and integrity checks to provide visibility into the application-layer attack surface and identify remediation mechanisms.

Advantageously, the security solutions disclosed herein provide a unified, comprehensive model of a software application by combining multiple analysis techniques. By employing an automated approach to accurately and exhaustively determine the security-relevant behaviors of a software application, an application information model of the application can be generated. The application information model can then be used as a basis for creating security policies that may be enforced at the client devices 101 and 102. In this manner, the software application receives improved protection from advanced application-layer attacks, thereby enhancing the user experience. Various scenarios that describe deployment of an application information model extraction module will now be discussed with respect to FIGS. 3 and 4.

FIG. 3 is a flow diagram that illustrates an operation of communication system 300 in an exemplary embodiment. The techniques described in FIG. 3 could be executed by the elements of communication system 100 and could be combined with operation 200 of FIG. 2 in some implementations. Communication system 300 includes software development life cycle (SDLC) or continuous integration and continuous delivery (CI/CD) pipeline 301, post-build/post-test new application notification 302, application analysis module 303, and application information model (AIM) repository 310.

In communication system 300, the AIM extraction module is inserted into the SDLC or CI/CD pipeline 301 using webhooks. Every time a new software application is built, the post-build/post-test new application notification 302 provides the image to application analysis engine 303. The application image is then automatically analyzed by application analysis engine 303 to derive the application information model before the application is deployed in a production setting. The application analysis engine 303 may use a combination of analysis techniques to generate the application information model, such as static analysis of the code resources associated with the application image, dynamic analysis of a running instance of the application, slimming analysis, hygiene analysis, and may employ a metadata and configuration extractors to perform metadata and configuration analysis, along with dependency analysis between components, libraries, frameworks, runtime parameters, and service discovery, to build a comprehensive and exhaustive application information model. In some examples, the AIM extraction process can automatically generate an AIM for each component of a multi-component distributed application and then intelligently combine all of the individual component models to generate an AIM for the entire application. The AIM is stored in the AIM repository 310, which can then be deployed to various security applications such as CSP for enforcement of the security policies for the application.

FIG. 4 is a flow diagram that illustrates an operation of communication system 400 in an exemplary embodiment. The techniques described in FIG. 4 could be executed by the elements of communication system 100 and could be combined with operation 200 of FIG. 2 in some implementations. Communication system 400 includes application information model (AIM) repository 410 and communication network 420.

In communication system 400, the AIM extraction process follows a phase of remotely gathering information about an application, such as by crawling a website or remotely exercising code of the application in a pre-production environment (labeled 10). The application analysis and analytics may also operate in a production environment (labeled 20). Further, the AIM extraction process can improve its accuracy by leveraging reports from the clients of the application, such as web browsers executing on the client devices (labeled 30). The dynamic analysis captures a comprehensive set of security-relevant behaviors or attributes of the application that describe the application's interaction with the client device, the server, third-party content and code repositories, such as CDNs and advertisement networks. Some relevant security features that are extracted during the AIM extraction process include identifying a whitelist of all code and script resources utilized by the application, which enables the security service to ensure that scripts are only retrieved from legitimate sources and have not been tampered with, effectively blocking attackers trying to introduce a new piece of code or tamper with existing code. The AIM extraction process could also identify a whitelist of all third-parties that an application retrieves resources from, to ensure that the application does not interact with untrusted third-party domains. The AIM extraction process also identifies a list of HTTP security headers currently used by the application, such as CSP, HTTP strict transport security (HSTS), and others, and automatically determines the optimal security header policies to protect the application. Further, the AIM extraction process can identify all client-side and server-side frameworks used in building the application, and identifies whether the application is properly utilizing the security capabilities offered by the frameworks, such as proper data access configurations and other security controls.

Once generated, the AIM is then stored in the AIM repository 410, which provides a collection of AIMs that tracks several different applications and their versions for a single organization or multiple organizations, security-relevant behaviors of applications built on specific ingredient technologies, such as languages, frameworks, libraries, third-party black box components, and security behaviors of components built by specific developers. Analytics on this repository provide valuable information such as the effective security techniques of application built on specific ingredient technologies, third-party software, and a correlation between developers and the security-relevant behaviors of the applications they develop. This information can also be used to automatically predict the best way to protect an application built using a specific ingredient technology or running in a specific infrastructure, such as a particular operating system, hardware platform, physical or virtual machine, and public, private, or hybrid cloud, for example. The analytics on the AIM repository 410 can also generate alerts if there is a significant anomaly associated with the security-relevant behavior of a developer or a new version of an application. Accordingly, the security service provides for tracking behaviors over the development lifecycle of the application, such as version changes from new features, bug fixes, language or framework changes, developer changes, and the like. The analytics performed on all of the application information models in the AIM repository 410 can also be used to make inferences about the impact of application development frameworks on security-relevant behaviors of applications that are built using such frameworks. Security-relevant behaviors of new applications can also be extrapolated or predicted based on prior history of other applications using similar ingredient technologies, components, and subsystems.

Beneficially, the security techniques disclosed herein can be employed to create an information model for an entire application, by intelligently merging application information models of each component or subsystem of the application. The application information model can then be used to produce a comprehensive whitelist of security-relevant behaviors of the application, which can be used with various security applications such as attack prediction, detection, prevention, and response tools. In this manner, users of an enterprise software application are better safeguarded against client-side attacks on the application.

Now referring back to FIG. 1, client devices 101 and 102 each individually comprise a processing system and communication transceiver. Client devices 101 and 102 may also include other components such as a user interface, data storage system, and power supply. Client devices 101 and 102 may each individually reside in a single device or may be distributed across multiple devices. Examples of client devices 101 and 102 include mobile computing devices, such as cell phones, tablet computers, laptop computers, notebook computers, and gaming devices, as well as any other type of mobile computing devices and any combination or variation thereof. Examples of client devices 101 and 102 also include desktop computers, server computers, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, local area networks (LAN), metropolitan area networks (MAN), wide area networks (WAN), or other network topologies, equipment, or systems—including combinations thereof. Communication network 120 may be configured to communicate over wired or wireless communication links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Server 130 may be representative of any computing apparatus, system, or systems on which the techniques disclosed herein or variations thereof may be suitably implemented. Server 130 comprises a processing system and communication transceiver. Server 130 may also include other components such as a router, server, data storage system, and power supply. Server 130 may reside in a single device or may be distributed across multiple devices. Server 130 may be a discrete system or may be integrated within other systems, including other systems within communication system 100. Some examples of server 130 include desktop computers, server computers, cloud computing platforms, and virtual machines, as well as any other type of computing system, variation, or combination thereof. In some examples, server 130 could comprise a network switch, router, switching system, packet gateway, network gateway system, Internet access node, application server, database system, service node, firewall, or some other communication system, including combinations thereof.

Computing system 140 may be representative of any computing apparatus, system, or systems on which the techniques disclosed herein or variations thereof may be suitably implemented. Computing system 140 comprises a processing system and communication transceiver. Computing system 140 may also include other components such as a router, server, data storage system, and power supply. Computing system 140 may reside in a single device or may be distributed across multiple devices. Computing system 140 be a discrete system or may be integrated within other systems, including other systems within communication system 100. Some examples of computing system 140 include desktop computers, server computers, cloud computing platforms, and virtual machines, as well as any other type of computing system, variation, or combination thereof. In some examples, computing system 140 could comprise a network switch, router, switching system, packet gateway, network gateway system, Internet access node, application server, database system, service node, firewall, or some other communication system, including combinations thereof.

Communication links 111-114 use metal, air, space, optical fiber such as glass or plastic, or some other material as the transport medium—including combinations thereof. Communication links 111-114 could use various communication protocols, such as TDM, IP, Ethernet, telephony, optical networking, hybrid fiber coax (HFC), communication signaling, wireless protocols, or some other communication format, including combinations thereof. Communication links 111-114 could be direct links or may include intermediate networks, systems, or devices.

Referring now to FIG. 5, a block diagram that illustrates computing system 500 in an exemplary implementation is shown. Computing system 500 provides an example of server 130, although server 130 could use alternative configurations. Computing system 500 also provides an example of computing system 140, although system 140 could use alternative configurations. Computing system 500 includes processing system 501, storage system 503, software 505, communication interface 507, and user interface 509. Software 505 includes application 506 which itself includes software application security process 200. Software application security process 200 may optionally be implemented separately from application 506. Application 506 could comprise a web service in some implementations.

Computing system 500 may be representative of any computing apparatus, system, or systems on which application 506 and software application security process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for wireless communication device and/or server 130 for execution of software application security process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer-readable storage media capable of storing software 505 and readable by processing system 501. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 509, processing system 501 loads and executes portions of software 505, such as application 506 and/or software application security process 200, to facilitate security for a software application. Software 505 may be implemented in program instructions and among other functions may, when executed by computing system 500 in general or processing system 501 in particular, direct computing system 500 or processing system 501 to perform static analysis on code resources associated with the software application to generate static analysis results, and perform dynamic analysis on a running instance of the software application to generate dynamic analysis results. Software 505 may further direct computing system 500 or processing system 501 to generate an application information model of the software application based on the static analysis results and the dynamic analysis results, and determine security policies for the software application based on the application information model.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate security for a software application as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506, software application security process 200, and variations thereof. However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 509. In some examples, user interface 509 could include a touch screen capable of displaying a graphical user interface that also accepts user inputs via touches on its surface. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface. User interface 509 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate security for a software application, the method comprising:
   performing static analysis on code resources associated with the software application to generate static analysis results;
   performing dynamic analysis on a running instance of the software application to generate dynamic analysis results, wherein performing the dynamic analysis comprises determining legitimate interactions between the software application and external entities at run time;
   performing dependency analysis on at least one of components, libraries, frameworks, runtime parameters, or service discovery of the software application to generate dependency analysis results;
   generating an application information model of the software application based at least on the static analysis results, the dynamic analysis results, and the dependency analysis results to define a set of security-relevant behaviors of the software application; and
   determining security policies for the software application based on the application information model, wherein the security policies are deployed to a security application for the software application.

2. The method of claim 1 further comprising performing metadata analysis on the software application to generate metadata analysis results, and including the metadata analysis results when generating the application information model of the software application to define the set of security-relevant behaviors of the software application.

3. The method of claim 1 wherein determining the security policies for the software application based on the application information model comprises generating a whitelist for the software application that indicates approved behavior of the software application.

4. The method of claim 1 wherein the security application for the software application comprises a content security policy (CSP) of a web browser.

5. The method of claim 1 wherein performing the static analysis on the code resources associated with the software application comprises analyzing at least one script associated with the software application to build an abstract syntax tree for the at least one script.

6. The method of claim 1 wherein performing the dynamic analysis on the running instance of the software application comprises remotely exercising functionality of the software application.

7. The method of claim 1 further comprising computing confidence levels for comprehensiveness of the static analysis results and the dynamic analysis results.

8. One or more computer-readable storage media having program instructions stored thereon to facilitate security for a software application, wherein the program instructions, when executed by a computing system, direct the computing system to at least:
perform static analysis on code resources associated with the software application to generate static analysis results;
perform dynamic analysis on a running instance of the software application to generate dynamic analysis results, wherein the dynamic analysis comprises determining legitimate interactions between the software application and external entities at run time;
perform dependency analysis on at least one of components, libraries, frameworks, runtime parameters, or service discovery of the software application to generate dependency analysis results;
generate an application information model of the software application based at least on the static analysis results, the dynamic analysis results, and the dependency analysis results to define a set of security-relevant behaviors of the software application; and
determine security policies for the software application based on the application information model, wherein the security policies are deployed to a security application for the software application.

9. The one or more computer-readable storage media of claim 8 wherein the program instructions further direct the computing system to perform metadata analysis on the software application to generate metadata analysis results, and include the metadata analysis results when generating the application information model of the software application to define the set of security-relevant behaviors of the software application.

10. The one or more computer-readable storage media of claim 8 wherein the program instructions direct the computing system to determine the security policies for the software application based on the application information model by directing the computing system to generate a whitelist for the software application that indicates approved behavior of the software application.

11. The one or more computer-readable storage media of claim 8 wherein the security application for the software application comprises a content security policy (CSP) of a web browser.

12. The one or more computer-readable storage media of claim 8 wherein the program instructions direct the computing system to perform the static analysis on the code resources associated with the software application by directing the computing system to analyze at least one script associated with the software application to build an abstract syntax tree for the at least one script.

13. The one or more computer-readable storage media of claim 8 wherein the program instructions direct the computing system to perform the dynamic analysis on the running instance of the software application by directing the computing system to remotely exercise functionality of the software application.

14. The one or more computer-readable storage media of claim 8 wherein the program instructions further direct the computing system to compute confidence levels for comprehensiveness of the static analysis results and the dynamic analysis results.

15. An apparatus comprising:
one or more computer-readable storage media; and
program instructions stored on the one or more computer-readable storage media that, when executed by a processing system, direct the processing system to at least:
perform static analysis on code resources associated with a software application to generate static analysis results;
perform dynamic analysis on a running instance of the software application to generate dynamic analysis results, wherein the dynamic analysis comprises determining legitimate interactions between the software application and external entities at run time;
perform dependency analysis on at least one of components, libraries, frameworks, runtime parameters, or service discovery of the software application to generate dependency analysis results;
generate an application information model of the software application based at least on the static analysis results, the dynamic analysis results, and the dependency analysis results to define a set of security-relevant behaviors of the software application; and
determine security policies for the software application based on the application information model, wherein the security policies are deployed to a security application for the software application.

16. The apparatus of claim 15 wherein the program instructions further direct the processing system to perform metadata analysis on the software application to generate metadata analysis results, and include the metadata analysis results when generating the application information model of the software application to define the set of security-relevant behaviors of the software application.

17. The apparatus of claim 15 wherein the program instructions direct the processing system to determine the security policies for the software application based on the application information model by directing the processing system to generate a whitelist for the software application that indicates approved behavior of the software application.

18. The apparatus of claim 15 wherein the security application for the software application comprises a content security policy (CSP) of a web browser.

19. The apparatus of claim 15 wherein the program instructions direct the processing system to perform the static analysis on the code resources associated with the software application by directing the processing system to analyze at least one script associated with the software application to build an abstract syntax tree for the at least one script.

20. The apparatus of claim 15 wherein the program instructions direct the processing system to perform the dynamic analysis on the running instance of the software application by directing the processing system to remotely exercise functionality of the software application.

* * * * *